US005219658A

United States Patent [19]

Ueoka

[11] Patent Number: 5,219,658

[45] Date of Patent: Jun. 15, 1993

[54] SELF-BONDING INSULATED WIRE AND COILS FORMED THEREFROM

[75] Inventor: Isao Ueoka, Aichi, Japan

[73] Assignee: Sumitomo Electric Industries, Ltd., Osaka, Japan

[21] Appl. No.: 440,847

[22] Filed: Nov. 24, 1989

[30] Foreign Application Priority Data

Nov. 24, 1988 [JP] Japan ................................ 63-297372

[51] Int. Cl.[5] ........................ B32B 27/00; D02G 3/00; H01B 7/00

[52] U.S. Cl. .................................... 428/383; 428/375; 428/379; 428/380; 174/110 E; 174/110 N; 174/110 SR; 174/120 SR

[58] Field of Search ............... 428/383, 380, 379, 375; 174/120 SR, 110, 110 N, 110 SR

[56] References Cited

U.S. PATENT DOCUMENTS 4,031,287 6/1977 Suzuki et al. ...................... 428/379
4,127,695 11/1978 Hirakawa et al. .................. 428/383
4,129,678 12/1978 Seki et al. ........................... 428/383
4,400,430 8/1983 Miyake et al. ...................... 428/383
4,420,535 12/1983 Walrath et al. ...................... 428/379
4,444,843 4/1984 Miyake et al. ................ 174/120 SR
4,493,873 1/1985 Keane et al. ........................ 428/383

FOREIGN PATENT DOCUMENTS 63-289711 11/1988 Japan .................................. 428/379

*Primary Examiner*—Patrick J. Ryan
*Assistant Examiner*—J. M. Gray
*Attorney, Agent, or Firm*—Sughrue, Mion, Zinn, Macpeak & Seas

[57] ABSTRACT

A self-bonding insulated wire and a coil formed therefrom are disclosed, which wire comprising a first fusion-bonding film comprising a polyhydroxyether resin having a glass transition temperature of not lower than 90° C. provided on an insulating film on a conductor; and a second fusion-bonding film comprising a polyamide copolymer resin having a melting point of from 50° to 150° C. provided further thereon, the second fusion-bonding film comprising the polyamide copolymer resin making up from 5% to 40% by film thickness of the entire fusion bonding films.

7 Claims, 1 Drawing Sheet

SELF-BONDING INSULATED WIRE AND COILS FORMED THEREFROM

FIELD OF THE INVENTION

The present invention relates to a self-bonding insulated wire which is an enameled wire having a self-fusion-bonding property and is useful for motors, transformers, magnetic coils, etc., and a coil prepared therefrom.

BACKGROUND OF THE INVENTION

Coil assemblies for electric machinery and apparatuses and communication machinery and apparatus have heretofore been prepared by winding an insulated wire into a desired shape, and thereafter varnishing it to cause mutual adhesion of the wire and solidification thereof. Recently, however, self-bonding insulated wires which can be mutually fusion-bonded only by heating or solvent treatment have come to be used in place of the conventional varnish impregnated wires.

The self-bonding insulated wire has a self-fusion-bonding layer composed mainly of a thermoplastic resin provided on an insulation layer of an enameled wire. From this wire, a coil is prepared by winding the wire into a coil shape and heat-treating or solvent-treating it during or after the winding to cause mutual adhesion of the wire, so that the varnish-impregnation treatment can be omitted, which results in the advantages as below:

(1) Pollution problems, and safety and hygiene problems which may be caused by use of an impregnation varnish are eliminated.

(2) Production cost can be reduced because the coil producing process is simplified and shortened by using no impregnation varnish but current-flow heating, for example.

(3) A coil which has a complicated shape or which does not allow penetration of varnish can be solidified.

Accordingly, with the increasing demand for self-bonding insulated wires, new materials therefor are desired which have various characteristics to meet production processes and the desired conditions of use. In particular, deflecting yoke coils which are used for televisions, etc., are subjected to various severe requirements by users and coil manufacturers because of the special shape and necessary strict dimensional accuracy of the coils.

Several years ago, coil manufactures changed the self-fusion-bonding material from a polyvinyl butyral to a polyamide copolymer resin to meet the requirements of low thermal deformation, high bonding strength at elevated temperatures (e.g. about 100° C.), and high flowability of the self-fusion bonding materials during the current-flow heat treatment which requirements came to be posed as a result of an increase of the deflection angles of television tubes.

Recently, higher precision CRT's have been demanded with the development of computers, which has led to the requirement for a further reduction of the deformation of deflecting yoke coils. Although the current polyamide copolymers used as self-fusion-bonding insulation materials exhibit a satisfactory bonding strength at an elevated temperature and adequate flowability, the materials per se are soft, so that a yoke coil prepared by using such polyamide copolymer self-bonding insulated wire has disadvantage in that the coil may be somewhat deformed by the spring-back force of the coil after the coil has been produced. Such deformation has become a problem with present high precision CRT's.

On the other hand, self-bonding insulated wires which employ a phenoxy resin as the self-fusion-bonding material are known. Such wires can give deflecting yoke coils exhibiting less deformation. However, the phenoxy resins are deficient in flowability at the heat treatment, so that they require a more intense electric current for current-flow fusion, or longer time of current flow for current-flow fusion in comparison with the conventional polyamide copolymers in order to prepare a coil with mutual wire bonding, which requires more heat energy and results in a rise of the production cost.

Furthermore, intense current flow for a long time disadvantageously causes thermal deterioration or short circuit of the wire.

The present inventors made comprehensive investigation to eliminate the above-mentioned disadvantages, and found the self-bonding insulated wire of the present invention which comprises a material having sufficient flowability similar to conventional polyamide copolymers and which enables the production of deflection yoke coils exhibiting low deformation after fabrication.

Recently, electric machines and apparatus have been more and more miniaturized, and higher reliability is required therefor; additionally, a reduction of the production cost is simultaneously desired.

SUMMARY OF THE INVENTION

An object of the present invention is to provide a self-bonding insulated wire which comprises an easily fusible material exhibiting excellent resistance to deformation and high hardness after fusion-bonding, and which is not only useful for deflection yoke coils but also useful in forming other coils.

According to one aspect of the present invention, there is provided a self-bonding insulated wire comprising a first fusion-bonding film comprising a polyhydroxyether resin having a glass transition temperature of not lower than 90° C. provide on an insulating film on a conductor; and a second fusion-bonding film comprising a polyamide copolymer resin having a melting point of from 50° to 150° C. provided further thereon, the second fusion-bonding film comprising the polyamide copolymer resin making up from 5% to 40% by film thickness of the entire fusion-bonding films.

According to another aspect of the present invention, there is provided a coil prepared by winding the self-bonding insulated wire described above.

BRIEF DESCRIPTION OF THE DRAWINGS

FIG. 1 illustrates a rough sketch of the cross sectional view of the deflecting yoke coil. In FIG. 1, 'a, b, and *c* respectively show the dimensions 40 mm, 90 mm, and 60 mm.

FIG. 2 illustrates takeout deformation (Δh).

Figure 1:
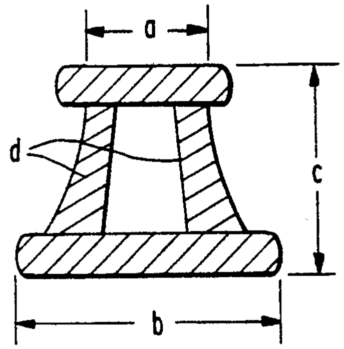
FIG. 1 and FIG. 2 show a deflecting yoke coil of the present invention.

In the Figures, 1 denotes a deflection yoke coil, and 2 denotes a smooth flat plate.

DETAILED DESCRIPTION OF THE INVENTION

The amount of the polyhydroxyether resin having a glass transition temperature of not lower than 90° C. is preferably 80 wt % or more based on the total amount of the first fusion-bonding film.

The polyhydroxyether resin having a glass transition temperature of not less than 90° C. in the present invention includes resins prepared from an aromatic diol such as bisphenol A, bisphenol F, bisphenol S, hydroquinone, resorcin, cathecol,biphenyldiol,dihydroxynaphthalene,dihydroxydiphenyl ether, dihydroxydiphenyl thioether, etc.; and epichlorohydrin, methyl epichlorohydrin or the like, where the benzene ring may be substituted by one or more of alkyl, halogen or other substituents.

The polyhydroxyether resin can be synthesized by any conventional method including direct reaction of an aromatic diol with an epichlorohydrin or the like; addition of epichlorohydrin to an aromatic diol to form an diepoxide and a subsequent further reaction of an aromatic diol therewith; other methods can also be used.

In particular, the use of a polyhydroxyether resin having a benzene ring substituted by one or more halogens is preferable in the case where a insulating film comprising an esterimide type of solderable insulation material is used because it does not impair solderability. Among the halogens, bromine is particularly preferable.

In the present invention, the polyhydroxyether resin is required to have a glass transition temperature of not lower than 90° C., preferably from 90° C. to 150° C., and more preferably from 100° C. to 130° C. With a glass transition temperature of lower than 90° C., the resin causes a large thermal deformation of the resulting coil so that the thermal resistance of the coil in use is not satisfactory.

Specific examples of the polyhydroxyether resing having a glass transition temperature of not lower than 90° C. include Phenoxy PKHH, PKHC made by Union Carbide Corp., and YP-50 made by Tohto Kasei Co., Ltd. Specific examples of the polyhydroxyether reins having a benzene ring substituted by halogens include YPB-25B and YPB-43C made by Tohto Kasei Co., Ltd.

The glass transition temperature can be measured by any of conventional method such as dilatometry, DSC or dynamic viscoelasticity measurement.

The amount of the polyamide copolymer having a melting point of from 50° C. to 150° C. is preferably 80 wt % or more based on the second fusion-bonding film.

The polyamide copolymer resin having a melting point of 50° to 150° C. is a copolymer prepared by copolymerization of a combination of polyamide resin materials such as adipic acid, sebacic acid, dodecanedioic acid, hexamethylenediamine, cyclohexanediamine, aminocaproic acid, aminoundecanoic acid, aminododecanoic acid, ε-caprolactam, δ-valerolactam, and ω-laurolactam to give a melting point of 50° C.–150° C. Specific examples are Daiamide T-170, T-250, T-350, T-450, T-550, and T-650 made by Daicel Ltd.; Platabond M-1276, M-1422, M-1259, M-1186, and M-1425, and Platamide H-105, H-104, H-005, and H-006 made by Nihon Rilsan K.K.; and CM-4000, and CM-8000 made by Toray Industries Inc.; and the like.

The polyamide copolymer resin used in the present invention is required to have a melting point of from 50° C. to 150° C., preferably from 50° C. to 130° C., and more preferably from 100° C. to 120° C. If the melting point is lower than 50° C., the self-bonding insulated wire mutually adheres within the reel to make further fabrication impracticable, while if the melting point is over 150° C., the fusion-bonding of the produced coil becomes insufficient, and the effect of the present invention is not achieved.

A polyamide copolymer resin having a melting point of from 50° C. to 130° C. is preferable since the fusion-bonding capability is remarkably improved.

The melting point can be measured by any conventional methods such as DSC, a capillary method, etc.

One can add to the polyhydroxyether resin having a glass transition temperature of not lower than 90° C., or the polyamide copolymer resin having a melting point of from 50° C. to 150° C., another different material such as a thermoplastic resin, a thermosetting resin, a plasticizer, a lubricant, a surfactant, a pigment, a dye, a filler and the like, for the purpose of somewhat improving the properties of the insulated wire, using such an amount of these optional materials so that the addition does not adversely affect the characteristics of the material. These are included in the present invention.

The present invention requires a first fusion-bonding film comprising a polyhydroxyether resin having a glass transition temperature of not less than 90° C. provided on an insulating film on a conductor; and a second fusion-bonding film comprising a polyamide copolymer resin having a melting point of from 50° C. to 150° C. provided further on the first fusion-bonding film, the second fusion-bonding film comprising the polyamide copolymer resin making up 5% to 40% by film thickness, preferably from 10% to 30% by film thickness, and more preferably about 20% by film thickness of the entire fusion-bonding films.

If the order of the formation of the first fusion-bonding film comprising a polyhydroxyether resin having a glass transition temperature of not lower than 90° C. and the second fusion bonded film comprising a polyamide copolymer resin having a melting point of from 50° C. to 150° C. is reversed, no effects of the present invention are achieved. If the fusion-bonding film comprising a polyamide copolymer resin constitutes less than 5% by film thickness of the entire fusion-bonding film, no effect is achieved of improving the adhesion, while if it constitutes more than 40% by film thickness of the entire fusion-bonding films, deformation occurs at fabrication and the effects of the present invention are not achieved.

The material for the insulating film employed in the self-bonding insulated wire is conventional and can be exemplified resins such as by a polyurethane, a polyvinyl formal, a polyester, a polyesterimide, a urethane, a polyesterimide, a polyesteramideimide, a polyhydantoin, a polyamideimide, and a polyimide. Further, a multilayer structure of a combination of the above materials can be used.

The self-bonding insulated wire of the present invention preferably comprises an insulating film having a film thickness specified in Japanese Industrial Standard (JIS C3053) provided on a conductor, having provided thereon a fusion-bonding film comprising a polyhydroxyether resin having a glass transition temperature of not lower than 90° C., which has further thereon another fusion-bonding film comprising a polyamide copolymer resin having a melting temperature of from 50° C. to 150° C., the fusion-bonding films having a total thickness corresponding to not more than the thickness of the insulating film of one higher grade in Japanese Industrial Standard JIS C3053.

Specifically, the total thickness of the fusion-bonding films is not more than that of the Class-0 structure for the wire having the insulating film of Class-1 structure, and the total thickness of the fusion-bonding films is not more than that of Class-1 structure for the wire having the insulating film of Class-2 structure. The terms "Class-0 structure", "Class-1 structure" and "Class-2 structure" are defined in JIS C3053.

The total film thickness of the fusion-bonding films exceeding that defined for one-higher grade results in a larger outer diameter of the finished wire, thus resulting in a larger size and lower performance of the coil.

The method for coating and baking the insulating film, the first fusion-bonding film and the second fusion-bonding film may be any of conventional methods such as coating by using a dice or felt, and baking by a conventional baking furnace.

The self-bonding insulated wire of the present invention is particularly effective for coils which are fusion-bonded by heating and is required to have a sufficient hardness after the fusion-bonding, specifically a hardness adequate for a deflecting yoke coil. A deflecting yoke coil using the self-bonding wire of the present invention can be produced by using any conventional means such as an ordinary deflecting yoke coil winder.

As the conductor, any of conventional conductive wires such as copper wires can be used in the present invention.

The examples below are intended to illustrate the present invention in detail without thereby limiting it in any way.

REFERENCE EXAMPLE 1

Phenoxy PKHH made by UCC Co. was dissolved in m-cresol to give a 20% resin concentration. This paint was referred to as Paint A-1.

The glass transition temperature of the Phenoxy PKHH was 100° C. according to DSC (measured using DSC-10 of Seiko Electronic Co.)

REFERENCE EXAMPLE 2

186g of an epoxy resin, Epicote #828 (epoxy equivalent: 186, made by Shell Chemical Co.), 125 g of bisphenol S (OH equivalent: 125, made by Konishi Kagaku K.K.), 2.8g of tri-n-butylamine, and 310 g of cyclohexanone were mixed and reacted at a temperature of 120° C. for 5 hours. The heating was stopped and 620 g of m-cresol was added thereto to give a paint containing 25% resin.

This paint was referred to as Paint A-2. The resin was found to have a glass transition temperature of 125° C. by DSC.

REFERENCE EXAMPLE 3

186 g of an epoxy resin, Epicoat #828 (epoxy equivalent: 186), 55 g of hydroquinone (first grade chemical reagent, OH equivalent: 55), 2.8 g of tri-n-butylamine, and 240 g of cyclohexanone were mixed and reacted at a temperature of 120° C. for 8 hours. The heating was then stopped and 480 g of m-cresol was added thereto to give a paint containing 25% resin.

This paint was referred to as Paint A-3. The resin was found to have a glass transition temperature of 80° C. by DSC.

REFERENCE EXAMPLES 4 TO 6

Polyamide copolymer made by Daicel Ltd., T-250 (Reference example 4), T-450 (Reference example 5) and N-1901 (Reference example 6) were dissolved respectively in m-cresol to give 20% resin solutions.

These paints were referred to as B-1 (T-250), B-2 (T-450), and B-3 (N-1901), respectively. The melting points as measured by DSC were 130° C. for T-250, 110° C. for T-450, and 160° C for N-1901.

COMPARATIVE EXAMPLE 1

Onto an annealed copper wire 0.3 mm in diameter, a polyesterimide: Grade H (made by Schenectady Chemicals, Inc., tradename Isomid RH), was coated and baked 8 times, and Paint A-1 prepared in Reference example 1 was coated thereon and baked 4 times to give a self-bonding insulated wire comprising a 0.020 mm thick insulating film and a 0.010 mm thick fusion-bonding film.

COMPARATIVE EXAMPLE 2

A self-bonding insulated wire having a 0.020 mm thick insulating film and 0.010 mm thick fusion-bonding film was prepared in the same manner as in Comparative example 1 except that Paint B-1 was used in place of Paint A-1.

EXAMPLE 1

Onto an annealed copper wire 0.3 mm in diameter, a polyesterimide: Grade H (tradename Isomid RH) was coated and baked 8 times, and there were coated thereon and baked Paint A-1 three times and then coated and baked B-2 once which were prepared as in the above Reference examples, to give a self-bonding insulated wire having a 0.020 mm thick insulating film, a 0.008 mm thick phenoxy fusion-bonding film, and a 0.002 mm thick polyamide copolymer T-450 fusion-bonding film.

EXAMPLES 2 AND 3, AND COMPARATIVE EXAMPLE 3

In the same manner as in Example 1 but adjusting the coating thicknesses of the fusion-bonding films, self-bonding insulated wires were prepared which comprised an insulation film 0.020 mm thick and fusion-bonding films: a phenoxy fusion-bonding film 0.009 mm thick and a polyamide copolymer T-450 fusion-bonding film 0.001 mm thick (Example 2); a phenoxy fusion-bonding film 0.007 mm thick and a polyamide copolymer T-450 fusion-bonding film 0.003 mm thick (Example 3); and a phenoxy fusion-bonding film of 0.005 mm thick and a polyamide copolymer T-450 fusion-bonding film 0.005 mm thick (Comparative example 3).

EXAMPLE 4 AND COMPARATIVE EXAMPLE 4

Self-bonding insulated wires having the same structure as in Example 1 were prepared in the same way as in Example 1 except that Paint A-2 (Example 4) or Paint A-3 (Comparative example 4) was used in place of Paint A-1.

EXAMPLE 5 AND COMPARATIVE EXAMPLE 5

Self-bonding insulated wires having the same structure as in Example 1 were prepared in the same way as in Example 1 except that Paint B-1 (Example 5) or Paint B-3 (Comparative example 5) was used in place of Paint B-2.

EXAMPLE 6

The self-bonding insulated wires prepared in Examples 1 to 5 and Comparative examples 1 to 5 were wound to coils by means of a deflecting yoke coil winder to prepare deflecting yoke coils.

The fusion-bonding strength of the first turns and the second turns at the inside portion (portion d in FIG. 1) of each of the resulting yoke coil was measured by a tension meter.

Figure 2:
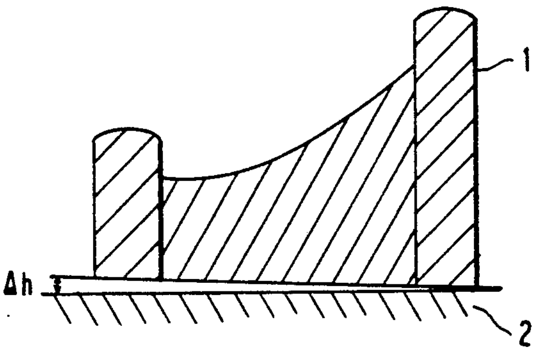

The resulting deflection yoke coil was placed on a flat smooth plate, and the gap (ah: takeout deformation) between the deflection yoke coil and the plate was measured as shown in FIG. 2.

Further, the deflection yoke coil was kept in a thermostatic chamber at 80° C. for a day, and the resulting deformation was measured in the same manner as above. The fusion-bonding strength and distortion are summarized in Table.

The thus prepared deflecting yoke coil had a shape as shown in FIG. 1.

EXAMPLE 7

Onto an annealed copper wire 0.3 mm in diameter, the following were coated and baked in the sequence given: a solderable esterimide (made by Dainichi Seika K.K., tradename: FS201) 8 times, a brominated phenoxy resin (made by Toto Kasei K.K., trade name: YPB-40AS-B45) 3 times, and Paint B-2 (prepared in Reference example 5) once, thereby forming a self-bonding insulated wire having an insulating film 0.020 mm thick, a fusion-bonding film of brominated phenoxy resin 0.008 mm thick, and a fusion-bonding film of a polyamide copolymer T-450 0.002 mm thick. The self-bonding insulated wire of Example 7 was dipped into a solder bath at 480° C. for 2 second and was found to be soldered homogeneously.

TABLE

| | Characteristics of Deflecting Yoke Coils | | | | | |
|---|---|---|---|---|---|---|
| | Polyhydroxy ether resin | Glass transition temperature (°C.) | Film thickness (mm) | Polyamide copolymer resin | Melting point (°C.) | Film thickness (mm) |
| Comparative experiment 1 | A-1 | 100 | 0.010 | — | — | — |
| Comparative experiment 2 | — | — | — | B-1 | 130 | 0.002 |
| Experiment 1 | A-1 | 100 | 0.008 | B-2 | 110 | 0.002 |
| Experiment 2 | A-1 | 100 | 0.009 | B-2 | 110 | 0.001 |
| Experiment 3 | A-1 | 100 | 0.007 | B-2 | 110 | 0.003 |
| Comparative experiment 3 | A-1 | 100 | 0.005 | B-2 | 110 | 0.002 |
| Experiment 4 | A-2 | 125 | 0.008 | B-2 | 110 | 0.002 |
| Comparative experiment 4 | A-3 | 80 | 0.008 | B-1 | 110 | 0.005 |
| Experiment 5 | A-1 | 100 | 0.008 | B-2 | 130 | 0.002 |
| Comparative experiment 5 | A-1 | 100 | 0.008 | B-3 | 160 | 0.002 |

| | Fusion-bonding strength | | Takeout | Deformation |
|---|---|---|---|---|
| | 1st turn (g) | 2nd turn (g) | deformation (mm) | at 80 C for one day (°C.) |
| Comparative experiment 1 | 0 | 0–50 | 0.30 | 0.50 |
| Comparative experiment 2 | 50–100 | 200–300 | 1.10 | 1.20 |
| Experiment 1 | 100–200 | 100–200 | 0.40 | 0.55 |
| Experiment 2 | 50–100 | 100–200 | 0.40 | 0.60 |
| Experiment 3 | 100–200 | 200–300 | 0.50 | 0.70 |
| Comparative experiment 3 | 100–200 | 200–300 | 0.80 | 1.00 |
| Experiment 4 | 100–200 | 100–200 | 0.35 | 0.40 |
| Comparative experiment 4 | 100–200 | 100–200 | 0.45 | 1.30 |
| Experiment 5 | 50–100 | 50–100 | 0.35 | 0.50 |
| Comparative experiment 5 | 0 | 0–50 | 0.30 | 0.35 |

The results of the experiments shown in Table show that the self-bonding insulated wires of the present invention exhibited fusion-bonding properties equivalent to that of a polyamide copolymer resin as well as resistance to thermal deformation equivalent to that of a phenoxy resin. Therefore, the use of the self-bonding insulated wire of the present invention enables easy production of a deflecting yoke coil which shows low deformation.

The coils which can be formed according to the present invention are not limited to defecting yoke coil, so that the self-fusion-bonding insulated wire of the present invention is of high industrial value.

While the invention has been described in detail and with reference to specific examples thereof, it will be apparent to one skilled in the art that various changes and modifications can be made therein without departing from the spirit and scope thereof.

What is claimed is:

1. A self-bonding insulated wire comprising a first fusion-bonding film comprising a polyhydroxyether resin having a transition temperature of not lower than 90° C. coated on an insulating film on a conductor; and a second fusion-bonding film comprising a polyamide copolymer resin having a melting point of from 50° to 150° C. coated on the first fusion-bonding film, wherein the second fusion-bonding film comprising the polyamide copolymer resin comprises form 5% to 50% of the total thickness of the first fusion-bonding film and the second fusion-bonding film, wherein said first fusion-bonding film and said second fusion-bonding film are coated in sequence on the insulating film and on the first fusion-bonding film, respectively, and wherein said first fusion-bonding film and said second fusion-bonding film are bonded to each other by fusion.

2. The self-bonding insulated wire as claimed in claim 1, wherein the glass transition temperature of said polyhydroxyether resin used in said first fusion-bonding film is 90° C. or more and the melting point of said polyamide copolymer resin is from 50° C. to 130° C.

3. The self-bonding insulated wire as claimed in claim 1, wherein the glass transition temperature of said polyhydroxyether resin used in said first fusion-bonding film is from 90° C. to 150° C. and the melting point of said polyamide copolymer resin is from 50° C. to 150° C.

4. The self-bonding insulated wire as claimed in claim 1, wherein the glass transition temperature of said polyhydroxyether resin used in said first fusion-bonding film is from 90° C. to 150° C. and the melting point of said polyamide copolymer resin is from. 50° C. to 130° C.

5. The self-bonding insulated wire as claimed in claim 1, wherein said insulating film comprising a solderable esterimide insulating film, and said polyhydroxyether resin has in the molecular skeleton thereof a benzene ring substituted with one or more halogen atoms.

6. The self-bonding insulated wire as claimed in claim 5, wherein said polyhydroxyether resin has in the molecular skeleton thereof a benzene ring substituted with one or more bromine atoms.

7. The self-bonding insulated wire as claimed in claim 1, wherein the second fusion-bonding film comprising the polyamide copolymer resin makes up from 10% to 30% by film thickness of the entire fusion bonding film.

* * * * *